United States Patent [19]

Suzuki et al.

[11] 3,894,881

[45] July 15, 1975

[54] COATING COMPOSITION

[75] Inventors: Masaharu Suzuki, Kusatsu; Takashi Taniguchi, Otso, both of Japan

[73] Assignee: Toray Industries, Inc., Tokyo, Japan

[22] Filed: Feb. 14, 1973

[21] Appl. No.: 332,513

[30] Foreign Application Priority Data
Mar. 21, 1972 Japan.............................. 47-27370

[52] U.S. Cl................106/287 SB; 117/138.8 UA; 117/161 ZA
[51] Int. Cl............................................. C09k 3/00
[58] Field of Search................ 106/287 SB; 260/825

[56] References Cited
UNITED STATES PATENTS

| | | | |
|---|---|---|---|
| 2,857,356 | 10/1958 | Goodwin | 260/46.5 R |
| 3,068,199 | 12/1962 | Seilers | 260/46.5 R |
| 3,560,244 | 2/1971 | Neuroth | 260/825 |

OTHER PUBLICATIONS

Chem. & Tech. of Silicones, No. 11, July 1971, pages 211–215.

*Primary Examiner*—Theodore Morris

[57] ABSTRACT

A coating composition, particularly for plastic substrates, providing improved surface properties such as scratch resistance, comprises a mixture of a separately hydrolyzed silicon tetraalkoxide, a separately hydrolyzed silicious compound, and a metal salt.

4 Claims, No Drawings

COATING COMPOSITION

BACKGROUND OF THE INVENTION

This invention relates to coating compositions, particularly for plastic substrates, which provide excellent surface properties such as scratch resistance, anti-solvent resistance, etc.

A large number of plastics, such as polymethylmethacrylate, polystyrene, and polycarbonate have achieved utility for many uses, because of their many properties that make them desirable for various applications — e.g. less density, transparency, good moldability, easy fabrication, and high impact resistance. However, the surface hardness and the solvent resistance of organic plastics are considerably inferior to that of inorganic glass, and hence the utilizable scope of plastics has been limited.

Considerable efforts have been expended in the preparation of scratch-resistant coatings such as polysilicic acid — organic polymer combinations and alkyltrialkoxysilane hydrolysis products. Generally, however, these materials have not achieved commercial importance since they have several disadvantages, e.g. they require a higher cure temperature (130° – 170°C) than the distortion temperature of a thermoplastic substrate, and moreover properties such as hardness, water resistance, etc., are still inadequate.

Investigations to overcome these deficiencies — to obtain a proper balance of weather, water, and scratch resistance, optical perfection, thermal stability, etc., of a coated film, along with easy application and stability of the coating solution — have been performed and have resulted in the present invention.

SUMMARY OF THE INVENTION

According to the present invention a coating composition is provided which comprises (A) a separately hydrolyzed silicon tetraalkoxide containing alkoxy groups of 1 to 5 carbon atoms; (B) a separately hydrolyzed silicious compound represented by the Formula $$RSi(OR')_3$$

wherein: R represents a member selected from the group consisting of alkyl and alkenyl groups each of which contains 1 to 3 carbon atoms, and R' represents an alkyl group containing 1 to 5 carbon atoms; and (C) at least one metal salt being selected from the class consisting of alkali metal carboxylates (containing 1 to 5 carbons), thiocyanate, nitrite, aluminate, carbonate.

DESCRIPTION OF THE PREFERRED EMBODIMENT

The silicon tetraalkoxide employed in this invention is a compound containing an alkoxy group of 1 to 5 carbon atoms such as methoxy, ethoxy, propoxy, butoxy. Silicon tetrabutoxide (Butyl Silicate) is the most preferable tetraalkoxide because of the excellent hardness, adherence, and clarity of the resultant film.

The hydrolyzed silicon tetraalkoxide can be obtained by a separate hydrolysis reaction in the presence of 0.1 N aqueous hydrochloric acid for several hours at room temperature.

The hydrolyzed silicon compound represented by the formula 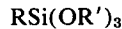 is produced separately from the tetraalkoxide by hydrolysis and condensation reactions of said silicon compound in the presence of hydrochloric acid. Both the hydrolysis and condensation reactions take place simultaneously. The degree of condensation should be kept appropriate to obtain a good result.

The above mentioned hydrolyzed product can also be obtained, for example, from the reaction between alkyl trichlorosilane and water dissolved in alcohol.

Examples of R are methyl, ethyl, propyl, vinyl, and allyl groups; those of R' are methyl, ethyl, propyl, butyl. An especially good result can be obtained by using methyl trimethoxy silane.

The use of a hydrolysis product of a compound $RSi(OR')_3$ is effective for the prevention of cracks when the coated film is cured. The preferable ratio of the hydrolyzed silicon tetraalkoxide to the hydrolyzed $RSi(OR')_3$ is 10–200/100 by weight, above which ratio a crack-free film can hardly be formed.

Examples of metal salts employed in this invention are lithium, sodium or potassium salts such as thiocyanate, aluminate, carbonate, organic carboxylate (acetate, propionate, butyrate, isobutyrate and valerate. The metal salt can easily be dissolved into the above mentioned hydrolyzed solution, acting as a hardening catalyst for the coated film without harming its appearance, because of good compatability.

The preferred amount of this catalyst is 0.01 – 10 parts by weight to 100 parts of the mixture of, respectively, a hydrolyzed silicon tetraalkoxide and a siliceous compound $RSi(OR')_3$. A lesser amount causes insufficient hardening, and a greater amount causes deterioration of adhesion or water resistance.

It is within the purview of this invention to add to the coating compositions of this invention compatible materials which do not affect the basic and novel characteristics of these compositions. Among such materials are surface active agents such as a block or graft copolymer of lower alkylene oxides and a lower dialkylsiloxane, which is very effective for smoothing the surface, coloring agents, including dyes and pigments, fillers, and similar additives. Additives such as antioxidants, antistatic agents, stabilizers and anti-foaming agents, may also be used.

This composition can be diluted with appropriate solvents which can be selected from those which commonly dissolve each component of this composition. Ordinary alcohols, especially lower aliphatic alcohols (containing 1 – 5 carbons) are suitable, and if necessary, high boiling ketones, esters or ethers can be mixed.

After the solution is applied on plastic articles, etc., the solvent is removed, preferably by evaporation. Heating of the coating is preferred to ensure complete removal of the solvent and to promote rapid formation of the hard, clear, chemical-resistant, adherent coating.

Any coating method can be used in practicing the present invention, for example, dipping, spraying, brushing, flowing, rolling, etc.

The compositions have excellent flow and viscosity characteristics with the result that they are easy to apply and the treated surfaces tend to be smooth and even.

The heating condition for curing this composition is considerably milder than in the case of conventional stoving paints. Since heating at a temperature of 80° – 90°C for 30 – 60 minutes is enough to cure, this composition can be successfully applied to thermoplastic substrates.

Since the cured film from the composition of this invention is hardly scratched even by strong rubbing with steel wool, transparent plastics such as polymethyl methacrylate coated with this composition do not suffer any appearance deterioration during usage and their commercial value becomes greater. Besides plastics, substrates such as paper, wood, metal, ceramics, etc. can be successfully used for this invention.

The coating composition of this invention is very useful especially for various optical instruments, such as spectacle lenses, contact lenses, telescope lenses, camera lenses, etc.

EXAMPLE 1

The following four kinds of solution or solvent were mixed in turn.

1. A solution obtained by adding 14 g of 0.1 N hydrochloric acid to 40 g of silicon tetrabutoxide dissolved in 26 g of ethyl alcohol and stored at room temperature for more than 15 hours.
2. 40 g of n-Butyl alcohol.
3. 12 g of a hydrolyzed methyltrimethoxy silane. (This hydrolyzate is prepared as follows: 200 ml of methyltrichlorosilane is slowly added into 500 ml of stirred methyl alcohol containing about 0.5% of water. After adding, the mixture is stirred for 2–3 hours and dry air is sent through to remove hydrogen chloride gas as well as residual methyltrichlorosilane and methyl alcohol, until the solution is separated into two phases. The lower phase, treated with dry sodium carbonate to remove water and hydrogen chloride, can be taken up as hydrolyzed methyltrimethoxy silane.)
4. 32 g of 1.23% by weight sodium thiocyanate solution in n-butyl alcohol.

After mixing (1) – (4), the solution was stirred and flow coated on a polymethylmethacrylate plate, which thereafter was heated in an electric oven at 90° for 1 hour.

The resultant coating film comprises:
A. 100 parts of hydrolyzed silicon tetrabutoxide.
B. 95 parts of hydrolyzed and condensated methyltrimethoxy silane.
C. 3.1 parts of sodium thiocyanate.

EXAMPLE 2

The general procedure of Example 1 was repeated except that methyl isobutyl ketone was used in place of n-butyl alcohol in (2). A good coating film was obtained.

EXAMPLE 3

The general procedure of Example 2 was repeated except that a hydrolyzed and condensated product from refined methyl trimethoxy silane (Toray Silicone) was used in place of a hydrolyzed product from methyl trichlorosilane.

Varying amounts of 0.1 N aqueous hydrochloric acid were used for hydrolyzing methyl trimethoxy silane. The resulting hydrolyzed solutions were mixed with varying amounts of the solution of hydrolyzed silicon tetrabutoxide in Example 1.

The results shown in Table 1 were obtained.

TABLE I

| Amount of 0.1 N HCl (gr) to 100 g of methyltri- methoxy silane | Weight ratio of hydrolyzed silicon tetrabutoxide and hydrolyzed methyltrimethoxysilane | | | | | | | | |
|---|---|---|---|---|---|---|---|---|---|
| | 2/1 | | | 1/1 | | | 1/2 | | |
| | Appearance | Pencil hardness | Hot water resistance[a] | Appearance | Pencil hardness | Hot water resistance | Appearance | Pencil hardness | Hot water resistance |
| 33 | crack | 7 H | OK | whiten | 9 H | OK | whiten | 7 H | OK |
| 26 | crack | 8 H | OK | crack | 9 H | crack | whiten | 8 H | OK |
| 20 | crack | 9 H | OK | good | 9 H | crack | whiten | 8 H | OK |
| 13 | crack | 9 H | OK | good | 9 H | crack | good | 9 H | OK |
| 7 | crack | 9 H | OK | crack | 9 H | crack | good | 9 H | peeled |

[a] 80°C 1 hr.

EXAMPLES 4– 31

1. Preparation of hydrolyzed silicon tetra-n-butoxide solution. 110 g of silicon tetra-n-butoxide (n-butyl silicate) was dissolved in 75 g of ethyl alcohol, and hydrolyzed with 40 g of 0.1 N hydrochloric acid.

The mixture, turbid at the beginning period, changed to clear after the reaction proceeded. After the reaction finished, the solution was aged more than 15 hours at room temperature or in a refrigerator (10°C). The solution contained 18% of hydrolyzed silicon tetra-n-butoxide.

2. Preparation of hydrolyzed methyl trimethoxy silane solution. 68 g of methyltrimethoxysilane was dissolved in 57 g of ethyl alcohol. Keeping the temperature at 15°– 20°C and stirring the solution, 27 g of 0.01 N hydrochloric acid was added slowly. After the addition, the solution was aged 2 hours at room temperature. The solution contained 31% of hydrolyzed methyltrimethoxysilane.

3. Preparation of coating solutions. To the above described (1) and (2) solutions, various metal salts and acetic acid were added at ratios shown in Table 2, to obtain coating solutions.

4. Coating and evaluation tests. A polymethylmethacrylate cast plate (Toray Industries' "Toreglass," 3mm thick) was cleaned by an ethylalcohol-water mixture, and dip coated with the above described coating solution. Withdrawal rate was 70 cm/min. The coated plate was heated for 1 hour in a 80°C air oven.

The following tests on the coated plate were carried out.

a. Adhesion:
   Cellophane adhesion tape (Nichiban Co's "Cellotape") applied on the surface of coating is rapidly peeled off in a right-angled direction.
b. Scratch resistance:
   The surface is rubbed with No. 0000 steel wool, then the degree of scratch is graded as follows:
   A: No scratch despite strong rubbing.
   B: Only slight scratches after strong rubbing.
   C: Scratched even with light rubbing.
(The scratch resistance of uncoated polymethylmethacrylate is C)
c. Pot life
   The prepared coating solution was preserved at room temperature to measure the deterioration time.
d. Appearance The coated polymethylmethacrylate plate was left for 24 hours at room temperature to determine whether any appearance change occurred or not. The test results are shown in Table 2.

atoms, and R' represents an alkyl group containing 1 – 5 carbon atoms; and c. about 0.01 – 10 parts by weight, on the basis of 100 parts by weight of the mixture of (a) and (b), of at

TABLE 2

| Example No. | COMPOSITION (Parts by Weight) | | | | PROPERTIES | | | | |
|---|---|---|---|---|---|---|---|---|---|
| | (A) | (B) | (C) | | Acetic Acid | Adhesion | Scratch Resist. | Pot life | Appearance |
| 4 | 100 | 0 | Sodium acetate | 2.8 | 28.0 | Poor | — | >7 days | OK |
| 5 | 232 | 100 | " | 2.4 | 24.0 | Poor | — | " | OK |
| 6 | 116 | 100 | " | 2.2 | 22.4 | Good | A | " | OK |
| 7 | 58 | 100 | " | 2.0 | 20.4 | Good | A | " | OK |
| 8 | 29 | 100 | " | 1.9 | 18.7 | Good | A | " | OK |
| 9 | 14.5 | 100 | " | 1.8 | 17.6 | Good | A | " | OK |
| 10 | 6.5 | 100 | " | 1.7 | 16.9 | Good | B | " | OK |
| 11 | 38.7 | 100 | — | | 0 | Poor | C | 24 hrs. | OK |
| 12 | 38.7 | 100 | — | | 19.4 | Poor | C | 24 hrs. | OK |
| 13 | 38.7 | 100 | Sodium acetate | 0.4 | 19.4 | Fair | A | 72 hrs. | OK |
| 14 | " | " | " | 0.8 | " | Good | A | >7 days | OK |
| 15 | " | " | " | 1.9 | " | Good | A | " | OK |
| 16 | " | " | " | 3.9 | " | Good | A | " | OK |
| 17 | " | " | " | 7.8 | " | Good | A | " | OK |
| 18 | " | " | " | 19.4 | " | Fair | A | " | OK |
| 19 | " | " | " | 1.9 | 0 | Fair | A | 24 hrs. | OK |
| 20 | " | " | " | 1.9 | 3.9 | Good | A | >7 days | OK |
| 21 | " | " | " | 1.9 | 11.6 | Good | A | " | OK |
| 22 | " | " | " | 1.9 | 23.2 | Good | A | " | OK |
| 23 | " | " | " | 1.9 | 38.8 | Good | A | " | OK |
| 24 | " | " | " | 1.9 | 77.5 | Good | A | " | OK |
| 25 | " | " | " | 1.9 | 116 | Good | A | " | OK |
| 26 | " | " | " | 1.9 | 155 | Good | A | " | OK |
| 27 | 38.7 | 100 | Sodium nitrite | 0.7 | 19.4 | Good | A | >7 days | OK |
| 28 | " | 100 | Potasium nitrite | 11.0 | 19.4 | Poor | A | " | OK |
| 29 | " | 100 | " | 0.9 | 19.4 | Good | A | " | OK |
| 30 | 38.7 | 100 | Sodium carbonate | 1.0 | 19.4 | Good | A | " | OK |
| 31 | 38.7 | 100 | Sodium aluminate | 0.03 | 19.4 | Good | A | " | OK |

(A): hydrolyzed silicon tetra-n-butoxide
(B): hydrolyzed methyl trimethoxysilane
Amounts of (C) and acetic acid are calculated for 100 parts by weight of (A) plus (B) mixture.

What is claimed is:

1. A coating composition which upon heating produces a cured coating having improved surface properties, said composition containing a mixture of separately hydrolyzed compounds containing silicon comprising,
   a. about 10 – 200 parts by weight of a separately hydrolyzed silicon tetraalkoxide, containing alkoxy groups having from 1 – 5 carbon atoms;
   b. mixed with 100 parts by weight of a separately hydrolyzed siliceous compound represented by the formula R Si (OR')$_3$, wherein R represents a member selected from the group consisting of alkyl and alkenyl groups each of which contains 1 – 3 carbon atoms, and R' represents an alkyl group containing 1 – 5 carbon atoms; and
   c. about 0.01 – 10 parts by weight, on the basis of 100 parts by weight of the mixture of (a) and (b), of at least one metal salt, said salt being selected from the group consisting of alkali carboxylate (containing 1 – 5 carbon atoms), thiocyanate, nitrite, aluminate and carbonate.

2. The coating composition of claim 1 wherein the hydrolyzed silicon tetraalkoxide is silicon tetrabutoxide.

3. The coating composition of claim 1 wherein the hydrolyzed siliceous compound represented by the formula R Si (OR')$_3$ is methyl trimethoxy silane.

4. The coating composition of claim 1 wherein the metal salt is an alkali metal carboxylate.

* * * * *